United States Patent [19]

Aruanno

[11] 4,003,644
[45] Jan. 18, 1977

[54] CINEMATOGRAPHIC VIEWER-PROJECTOR

[75] Inventor: Angela Aruanno, Milan, Italy
[73] Assignee: Lamy S.r.l., Milan, Italy
[22] Filed: Jan. 23, 1974
[21] Appl. No.: 435,991

[30] Foreign Application Priority Data

Jan. 25, 1973 Italy .................................. 19584/73
Dec. 31, 1973 Italy .................................. 32426/73

[52] U.S. Cl. ................................ 352/72; 352/104; 352/202; 353/71
[51] Int. Cl.$^2$ ........................................ G03B 21/10
[58] Field of Search ............ 352/72, 104, 202, 194; 353/71, 74, 77, 61

[56] References Cited

UNITED STATES PATENTS

| | | | |
|---|---|---|---|
| 2,135,500 | 11/1938 | Foster | 352/202 |
| 3,387,535 | 6/1968 | Bennett | 352/104 X |
| 3,391,979 | 7/1968 | Lessler | 353/71 X |
| 3,582,195 | 6/1971 | Pignone | 352/104 X |
| 3,610,747 | 10/1971 | Bickel | 353/61 |
| 3,694,065 | 9/1972 | Roth | 352/194 X |
| 3,739,069 | 6/1973 | Sandmeir | 353/77 X |
| 3,771,862 | 11/1973 | Land | 352/72 |
| 3,787,114 | 1/1974 | Catalano et al. | 352/72 |
| 3,807,847 | 4/1974 | Okano | 353/71 |

Primary Examiner—L. T. Hix
Assistant Examiner—Alan Mathews
Attorney, Agent, or Firm—Fleit & Jacobson

[57] ABSTRACT

A projector and/or viewer (monitor) for motion-picture films continuously unwinding and winding on a spool within a magazine, characterized by comprising: a casing or case having a translucent wall operating as a screen and on another wall an opening for inserting and removing the magazine; a frame internally of said case defining a housing which at one end thereof communicates with the opening in said case and intended for the passage of the magazine, while another end thereof has a slit or opening for exposing the frames of the film moving in front of it and an optical projection system, said frame carrying: a light source mounted sidewise of the magazine housing for illuminating through a reflecting means the film frames; an electrical motor controlling a rotating shutter disc, having on one face a U-shaped cam for operating the claw for drawing the film in front of the exposition slit or opening, and by means of mechanical drives also controlling the pin of the film spool contained in the magazine and fans for cooling the elements heated by the light source, said case also carrying a second reflecting means which is movably retractably mounted against an opening provided on the case wall in front of said optical system, this opening serving for projection on a separate external screen, when said second reflecting means is displaced.

5 Claims, 9 Drawing Figures

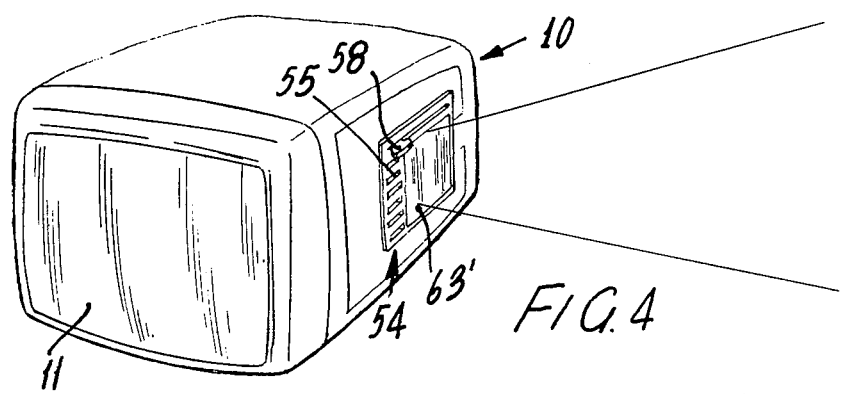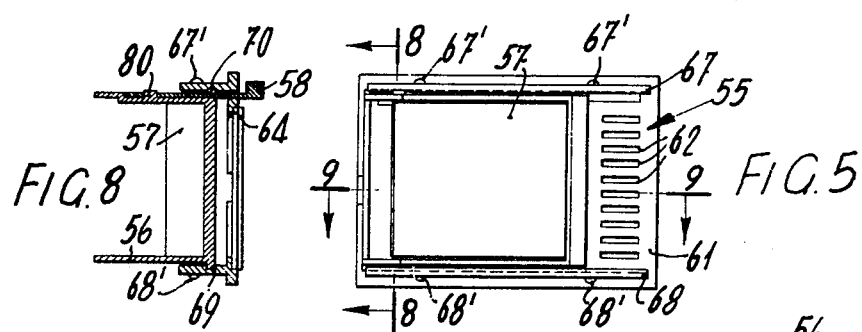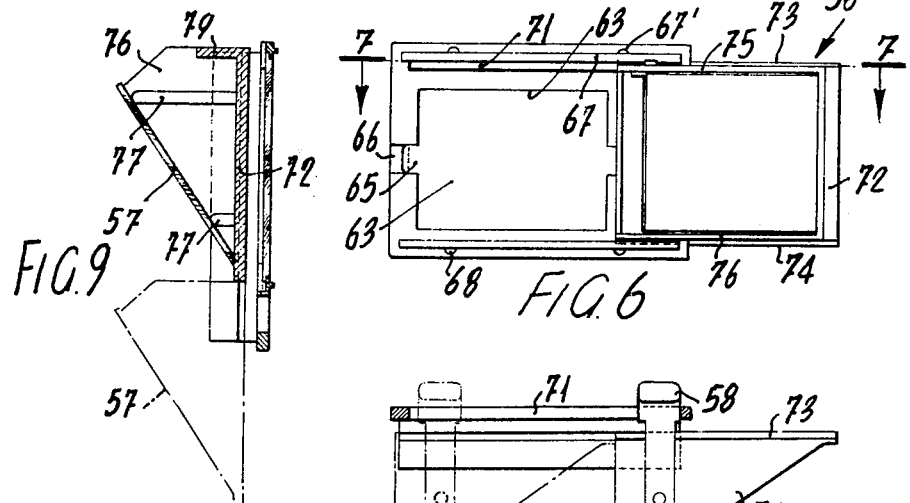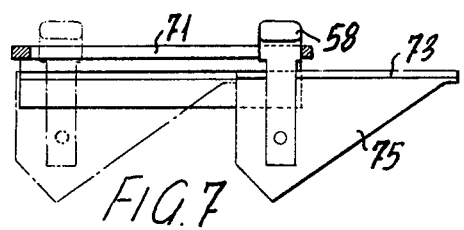

CINEMATOGRAPHIC VIEWER-PROJECTOR

This invention relates to improvements in or relating to cinematographic projectors and/or viewers (monitors) of the type where a motion-picture film is continuously unwound and wound up on a spool within a cassette magazine.

It is the object of the invention to provide a cinematographic viewer-projector structure which is of extremely simple construction, reliable in use and also affording reduced overall size owing to a particular arrangement of the components thereof.

It is a further object of the present invention to provide a cinematographic viewer-projector, wherein the provision of a suitable channel for conveying the cooling air to the projection lamp enables the use of halogen lamps which, well known, are of reduced size, while supplying a high lighting power for an improved display.

Means are also provided for aiding in passing from the use of the apparatus as a monitor to the use of it as a projector, thereby providing maximum advantages in forming, molding and assembling the several components thereof.

A viewer-projector according to the invention for use with a motion-picture film continuously unwinding and winding on a spool within a magazine, comprises: a housing, one side of which comprises at least one screen and another side having an opening for introducing at least one magazine; an inner frame defining a housing, on one side communicating the opening in said housing and having at its other end a slit or window for exposing the frames of the film advancing in front of it and an optical projection system; on that side of the magazine housing said frame carrying a light source, the light beam of which striking through a reflecting mirror the moving film frames, while on the other side of the housing said frame carries an electrical control motor for the rotating shutter, the latter having a U-shaped cam for operating a film drawing claw in front of the exposition opening and is also connected with a rotating pin, rotatably driving the film spool within the magazine.

A simplified variant comprises a housing wherein a fixed frame provided with sliding guides is pressure fitted and on which a movable frame carrying the reflecting means is slidable.

In its two embodiments, the cinematographic viewer-projector will be more particularly described in connection with the accompanying drawings in which:

FIG. 4 is a perspective view of a viewer-projector apparatus having a slidable mirror supporting frame device placed in position;

FIG. 5 shows the device on the side internally of the apparatus with the mirror at a first position;

FIG. 6 is a view similar to FIG. 5 with the mirror at a second position;

FIG. 7 is a sectional view taken along line 7—7 of FIG. 6, wherein the first position of the mirror is shown by chain lines;

FIG. 8 is a sectional view taken along line 8—8 of FIG. 5; and

FIG. 9 is a sectional view taken along line 9—9 of FIG. 5, wherein the second position of the mirror is shown by chain lines.

Figure 1:
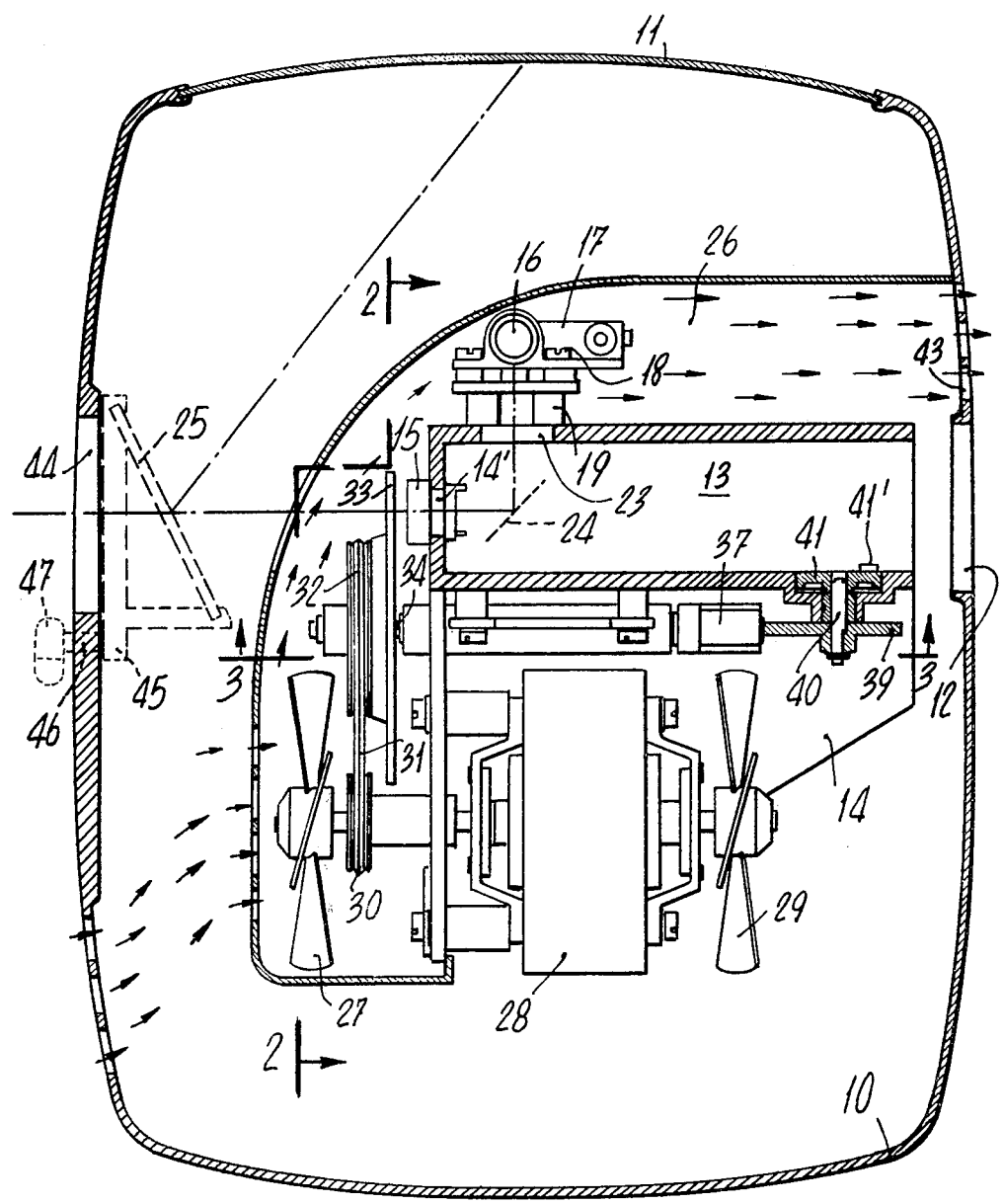
FIG. 1 is a sectional plan view showing a viewer-projector according to the invention.
Figure 2:
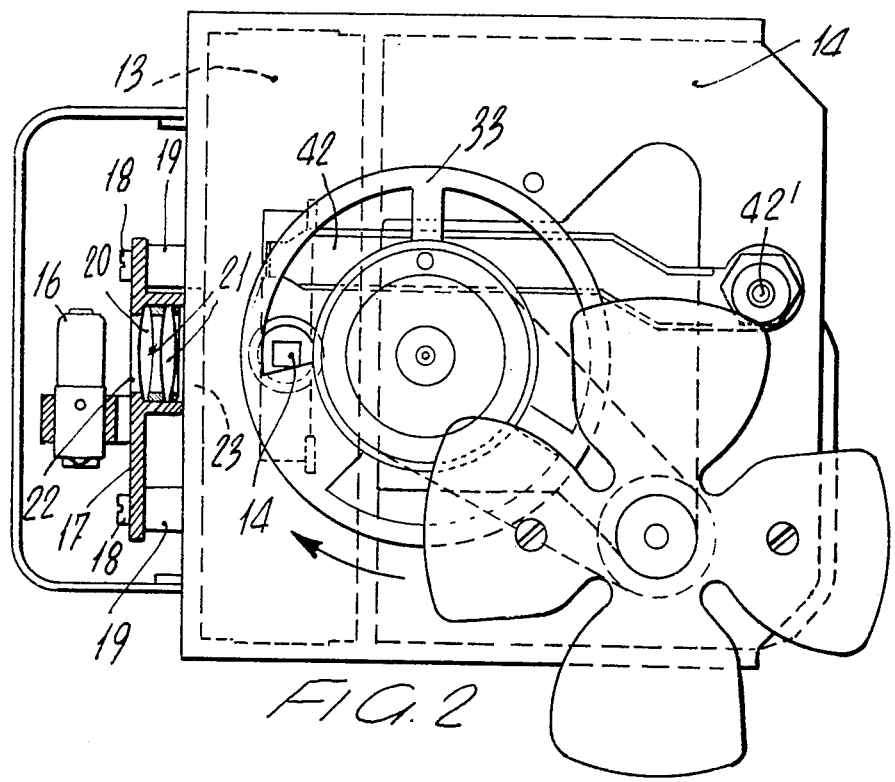
FIG. 2 is a vertical sectional view taken along line 2—2 of FIG. 1, but on a somewhat enlarged scale.
Figure 3:
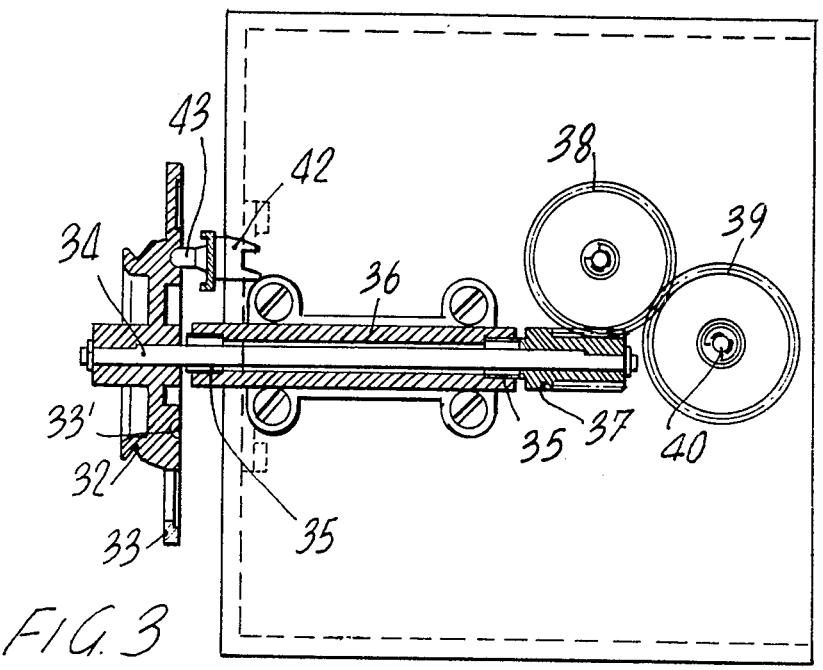
FIG. 3 is a vertical sectional view taken along line 3—3 of FIG. 1, showing a further enlarged detail.

Referring to the embodiment shown in FIGS. 1–3, it will be seen that a cinematographic viewer-projector according to the invention substantially comprises a cabinet or casing 10, one side of which comprises a screen 11, while an opening 12 is formed on another side for introducing and removing a magazine (not shown) from a housing 13 carried by a frame 14 positioned internally of the housing or cabinet 10.

The housing 13 has its open end facing the magazine insertion opening 12 and at its opposite end has an opening 14' for exposing the motion-picture frames of the inserted magazine, said opening 14' being aligned with the optical axis of the projection lens 15 (schematically shown) receiving illumination from a light source 16, which is carried on said frame 14 sidewise of a magazine housing 13 and which may be, for example, a halogen lamp carried by a support 17, secured by fastening means, such as screws 18 and spacers 19, on a wall of said housing 13. This support 17 comprises a cavity 20 containing the lenses 21 for the optical condenser, so that the light provided by the lamp 16, on passing through an opening 22 in the lamp support in front of the optical condenser 21 and a corresponding opening 23 in the wall of housing 13, will be shifted by a reflecting mirror 24 (shown by dashed lines in FIG. 1) to the frames of the film being drawn in front of the exposition opening 14' and of the optical system 15. The images are therefrom shifted again through a further mirror 25, schematically outlined in FIG. 1, to the screen 11.

The projection lamp 16 is also mounted within a conduit 26, in which cooling air for the lamp is circulated as drawn through a fan 27, the latter being supported on the shaft of an electrical motor 28 carried by said frame 14 on the side opposite to the side of the projection lamp 16. This cooling air can be vented to the atmosphere, for example, through slits 43 provided on the wall of the cabinet or casing 10.

The electrical motor 26 is also operative for the projector film drawing device, and at the rear also has a second fan 29 for cooling thereof.

Thus, the shaft of motor 28 (FIG. 1) carries a pulley 30 which through a belt 31 is connected with a second pulley 32 fast with a shutter 33 rotatably carried in front of the opening 14' and the optical system 15 for exposing the motion-picture film. As apparent, instead of the pulleys 30, 32 and driving belt 31, any other driving system could be used.

The shutter 33 is carried by a spindle 34 by idly mounted on the frame 14 parallel to the housing 13 and rotating in bushings 35 (FIG. 3) accommodated within a bearing 36, and at its other end is connected with a worm screw 37 driving through a helical gear 38 and a gear 39 fast with the drawing pin 40 for the winding and unwinding spool of the motion-picture film within the magazine (not shown).

More particularly, as best shown in FIG. 1, the drawing pin 40 is at its other end rendered fast with a rotating disc 41, having a tooth 41' projecting inwardly of the housing 13 and suitable to engage a corresponding projection or toothing on the spindle of the magazine spool. It is apparent that in lieu of the mechanical system using a helical gear and worm screw drive, any other drive system could be used, although the system shown is deemed a highly satisfactory approach.

Independently of the winding spool control, the drawing of the motion-picture film passing in front of the exposition opening 14' is accomplished by a claw 42 having projections engaging the corresponding side perforation of the motion-picture film, said claw 42 being driven by a cam rotably driven by said shutter 33.

More particularly, as shown in the sectional view of FIG. 3, the shutter is made of molded plastic material and on its face facing the claw has U-shaped cam 33', wherein a spoke or pin 43 is slidable and fast with said claw 42. The claw 42 is pivoted at 42' on the frame 14 for reciprocating in a vertical plane at a rate determined by the gear ratio between the electrical motor 28 and the shutter pulley 32, and in accordance with the profile of said cam 33'. The provision of the U-shaped cam 33' in the shutter 33 allows for a more economical construction and generally supplies an accurate, continuously times positive control to the drawing claw 42 of the motion-picture film.

The projection system for images on the screen 11 incorporated in the apparatus cabinet or casing 10 has been hitherto described and shown. However, it is apparent that the apparatus could be changed into a projector for image formation on a screen externally of and separated from the apparatus.

To this end, the reflection mirrros 25 can be movably or even, detachably mounted for clearing the opening 44 provided on the wall of said casing 10 and aligned with the magazine opening 14' and the optical film projection system 15.

For example, the mirror 25 could be carried by a frame 45 pivoted at 46 on a pin projecting from the casing 10 and provided with a control knob 47. In this case, the mirror could be rotated through 180° about the pin 46 to clear the opening 44. The mirror carrying frame 45 could be slidably carried by suitable guides provided internally of the wall of said casing 10. It should be apparent that the above suggested approaches will depend on the particular arrangement shown for the frame 14 and members carried thereby, still considering that other approaches of equivalent purpose as those shown are possible.

The embodiment of the viewer(monitor)-projector apparatus according to FIGS. 4–9 comprises within its casing or case 10 an incorporated or built-in screen 11 and a movable mirror supporting device, designated as a whole at 54, and placed within a suitable housing provided in said case 10. In its portion inside of the case, said device 54 comprises an inclined mirror. The light beam from the projection lens of an image projection system, not to be described herein, can either strike the inclined mirror, and be shifted to the screen 11, when using the apparatus as a viewer or monitor, or can exit from the apparatus through an opening provided in the case 10 to be projected on an external screen, when using the apparatus as a projector, that is with the inclined mirror displaced from the path of the light beam.

The device 54 substantially comprises a stationary frame 55 and a movable mirror supporting frame 56, carrying the mirror 57 and a control knob 58.

The stationary frame 55 comprises an external plate 61, preferably but not necessarily provided with grid openings 62 for the passage of cooling air, and fitted with a projection slit or window 63, preferably closed by a slide or other transparent means, which is carried by a lug portion 64 of the plate and attached, for example, by tangs 65 accomodated within suitable grooves 66 in the plate. Two strips 67 and 68 rise from the plate 61 on that side which, when the device is assembled, will be facing inwardly of the apparatus, these strips 67 and 68 outwardly carrying engaging means, such as projections 67' and 68', for clamping within the housing provided in said case 10(or said strips could be made to aid in clamping) and internally having parallel guide grooves 69 and 70. The stationary frame also has a slit 71 parallel to the guides, the function of which will be disclosed hereinafter, and in the case stiffening ribs.

The movable frame 56 (FIG. 6) comprises a preferably opaque bottom plate 72, laterally extended by guide projections 73 and 74 suitable for sliding engagement in the grooves 69 and 70; and two side tabs 75 and 76 carrying the inclined mirror 57, for example, between suitable supports generally designated at 77. This mirror can be secured in place by gluing, or any other known means, or the tabs 75 and 76 can have stop members on the opposite side of the mirror relative to the supports 77 for clamping the mirror in place.

Reference numeral 79 designates a stiffening plane which can be provided, if required.

The control knob or handle 58 is made fast with the movable frame 56, the gripping end of which extends through said slit 71; the ends of said slit 71 operate as end of stroke. The handle 58 can be rendered fast with a tab, such as tab 75, in any suitable manner. In the embodiment shown, a spoke 80 is provided fast with the tab, on which the handle is attached through a hole thereof.

The preferred material for the desired device is a moldable plastic material, while any material could be used therefor.

As it will be readily understood from the drawing and the foregoing description, in the assembling step of the monitor-projector, the previously assembled device is fitted on the case 10, engaging the stationary frame in a suitable housing thereof. By moving the handle 58, the movable frame can be caused to slide on the stationary frame. At the first position of the movable frame (FIGS. 4 and 9 and shown by chain lines in FIG. 7), the projection beam is shifted by the mirror and at the second position (FIGS. 5 and 7 and shown by chain lines in FIG. 9) the projection beam passes to the outside through the transparent means of the slit or window 63.

Changes and modifications can be made to the present invention to adapt the apparatus to any type of film and associated magazine or cassette, such as Super eight, Eight mm, and Single eight.

What is claimed is:

1. A projector-viewer for motion picture films continuously unwinding and winding on a spool within a magazine, comprising, in combination, a case having a translucent wall operating as a screen, and defined in another wall first opening for inserting and removing the magazine; a frame mounted internally of said case defining a magazine housing which at one outer opened end thereof communicates with said first opening in said case for the passage of the magazine, while the other opposite end thereof has an exposition opening across which the film passes for exposing a frame of the film moving in front of the exposition opening and an optical projection system aligned with the exposition opening, a light source mounted on a larger side of the magazine housing which extends between said one outer opened end and the other opposite end, said larger side having an opening located to correspond with the light source so that the light from the light source passes therethrough to be reflected by a mirror on the magazine onto the frames of the film; an electrical motor controlling a rotating shutter disc having on a face thereof a U-shaped cam for operating a claw drawing the film in front of the exposition opening, and also controlling by means of mechanical drives a pin for the film spool in the magazine and cooling fans, said case having defined therein a second opening in front of the optical projection system and a reflecting means carried on a movable reflecting means frame mounted on said case slidably with respect to said second opening and being mounted to be movable between a first position covering said second opening and reflecting an image to said screen, and a second position uncovering said second opening, a stationary frame secured to said case in registry with said second opening, said stationary frame having projection window masked by a transparent means, said reflecting means including an inclined mirror and the movable frame carrying the inclined mirror at a position inwardly of the case, and a control handle outwardly projecting from a slit defined in the stationary frame for imparting a sliding movement to the movable frame relative to the stationary frame for moving the reflecting means.

2. The projector-viewer of claim 1, wherein said stationary frame comprises grid openings for air passage.

3. The projector-viewer of claim 1, wherein said handle is secured to the movable frame by engagement of a hole defined therein on a spoke projecting from said frame.

4. A projector-viewer for motion picture films continuously unwinding and winding on a spool within a magazine comprising, in combination, a case having a plurality of walls defining an interior and including a translucent wall forming a screen and another wall having a first opening for insertion and removal of the film magazine, a frame supported within said case interior, a magazine housing on said frame having oppositely disposed open ends, one of said housing open ends being aligned with said case wall first opening for passage of a film magazine, the other of said housing open ends providing an exposition opening across which the film passes for exposing the frames of the film moving in front of said exposition opening, an optical projection system supported on said housing in alignment with said exposition opening, a light source mounted exteriorly on one side of said housing intermediates said open ends, said housing one side having an opening adjacent said light source for emitting light into said housing for illumination of the frames of the film, an electric motor having a shaft mounted on said frame on the opposite side of said housing from said light source, a shutter disc rotatably mounted on said frame, means for drivably connecting said motor shaft to said shutter disc, means actuated by said shutter disc for intermittently advancing said film, means for drivably connecting said motor shaft to the spindle of a magazine within said housing, a fan mounted on one end of said motor shaft, conduit means having an inlet and outlet supported on said frame in enclosing relationship with said fan and said light source for conducting a flow of cooling air over said light source, said case having a wall provided with a second opening in alignment with said optical projection system and reflecting means mounted in the interior of said case for movement between a first position covering said second opening and reflecting an image to said screen and a second position uncovering said second opening.

5. A projector-viewer in accordance with claim 4 including an auxillary fan mounted at the other end of said motor shaft for cooling said motor.

* * * * *